United States Patent [19]

Glennon

[11] 4,382,275
[45] May 3, 1983

[54] PWM INVERTER CIRCUIT

[75] Inventor: Timothy F. Glennon, Rockford, Ill.

[73] Assignee: Sundstrand Corporation, Rockford, Ill.

[21] Appl. No.: 327,872

[22] Filed: Dec. 7, 1981

[51] Int. Cl.³ .............................................. H02M 1/12
[52] U.S. Cl. ..................................... 363/41; 318/811; 363/72
[58] Field of Search .................. 318/811, 599; 363/41, 363/71, 72

Primary Examiner—William M. Shoop

Attorney, Agent, or Firm—Harold A. Williamson; Ted E. Killingsworth; Michael B. McMurry

[57] ABSTRACT

This invention relates to a pulse width modulated inverter circuit having an output signal with reduced harmonic content. The inverter circuit includes a first circuit that provides a filtered fundamental pulse width modulated signal. A second circuit is electrically coupled to the first circuit to receive the signal and sum therewith a controlled signal and the filtered fundamental pulse width modulated signal. The second circuit thereby providing the output signal with reduced harmonic content.

19 Claims, 10 Drawing Figures

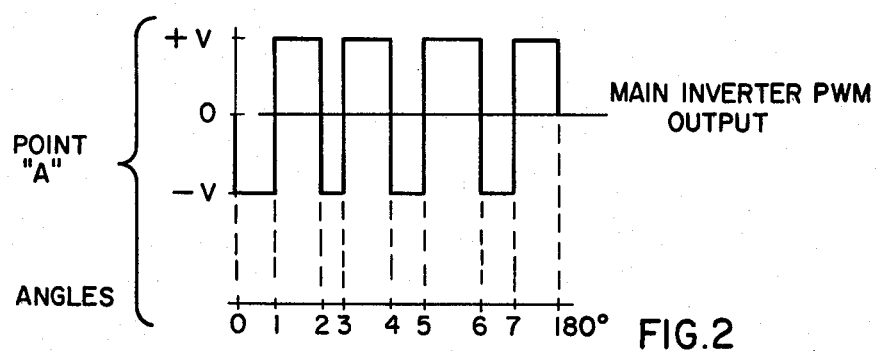
FIG.2 — MAIN INVERTER PWM OUTPUT (POINT "A", ANGLES 0 1 2 3 4 5 6 7 180°)
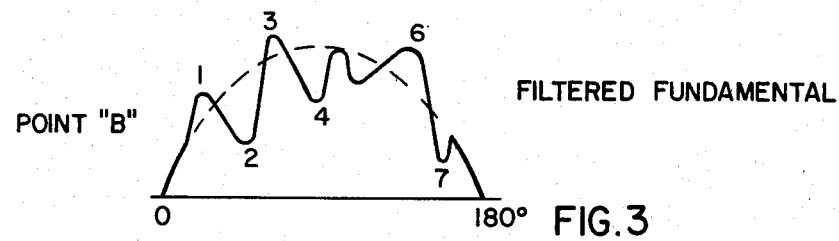
FIG.3 — POINT "B", FILTERED FUNDAMENTAL
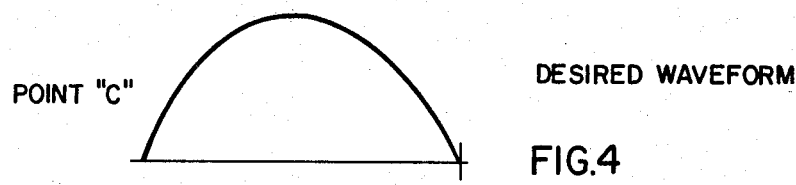
FIG.4 — POINT "C", DESIRED WAVEFORM
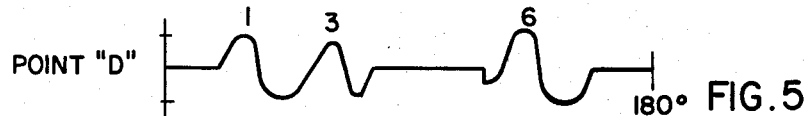
FIG.5 — POINT "D"
FIG.6 — POINT "E"
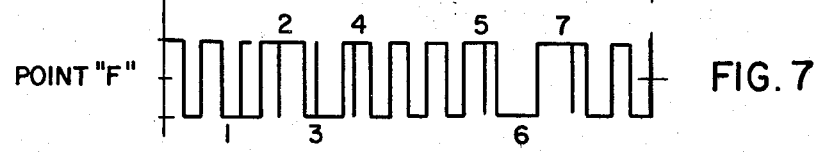
FIG.7 — POINT "F"
FIG.8 — POINT "G"
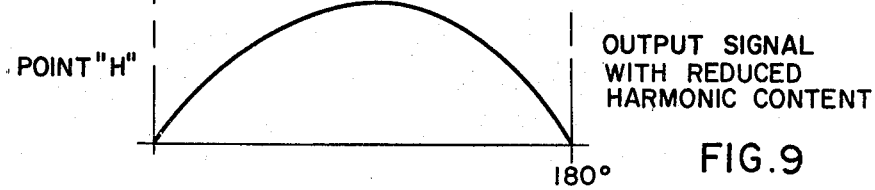
FIG.9 — POINT "H", OUTPUT SIGNAL WITH REDUCED HARMONIC CONTENT

PWM INVERTER CIRCUIT

TECHNICAL FIELD

This invention relates to a pulse width modulated inverter circuit having an output signal with reduced harmonic content.

BACKGROUND ART

Pulse width modulated transistor inverter circuits are well-known. State-of-the-art inverter circuits of this type generally operate with the pulses per cycle of the pulse width modulating waveform numbering 3 or 15. It is, of course, recognized that any number of pulses per cycle are possible. For a given output waveform and given number of pulse per cycle, the harmonic content may be calculated and the result compared with a sine wave as a measure of quality.

Numerous problems prevent inverter circuits of this type from getting a low harmonic content sine wave. Typical of these problems are those that arise from load and source characteristics as well as switching transients in the inverter. The presence of finite variable switching time in addition to the non-linearity of the switches and the load further contribute to the imperfections present in the inverter transistor circuit sine wave output.

The desirability of reducing the harmonic content of an inverter circuit output is recognized in the patent to Klein, U.S. Pat. No. 3,979,662, in which two inverters are employed. The two inverters are connected to supply electrical power to a common load. The harmonic content is reduced by interconnecting the inverters by means of transformers to cancel some of the harmonic voltages, and a main component of output power of one of the inverters is used directly without being transformed. The patent to Klein does not, as the invention to be described more fully hereinafter, provide for an inverter circuit having a reduced harmonic output signal accomplished by summing a filtered fundamental PWM signal with a controlled signal from another inverter, which controlled signal is the function of the sum of a desired waveform signal and the filtered fundamental PWM signal.

The problem of harmonic content present in an inverter circuit output signal is also addressed in the patent to Taddec et al., U.S. Pat. No. 4,067,057. The Taddec et al. patent teaches switching the transistors in the inverter circuit at a rate significantly higher than desired output frequencey of the AC output power. The increased switching frequency, however, results in increased switching losses becoming a problem in the transistors. The invention to be described hereinafter avoids this problem by employing in a main inverter circuit that has a switching rate of a fixed frequency.

DISCLOSURE OF INVENTION

More specifically, this invention relates to a pulse width modulated inverter circuit having an output signal with reduced harmonic content. The inverter circuit includes a first circuit that provides a filtered fundamental pulse width modulated signal. A second circuit is electrically coupled to the first circuit to receive the signal and sum therewith a controlled signal and the filtered fundamental pulse width modulated signal. The second circuit thereby providing the output signal with reduced harmonic content.

It is therefore a primary object of the invention to run a pulse width modulated inverter at a fixed frequency and add a second pulse width modulation signal to a filtered fundamental signal from the fixed frequency operated pulse width modulation inverter to thereby provide an output signal with reduced harmonic content.

Another object of the invention is to provide a controlled signal that is the function of the sum of a desired waveform signal and a filtered fundamental signal from a PWM inverter to thereby provide an output signal with reduced harmonic content when the controlled signal is summed with a filtered fundamental from the PWM inverter.

Yet another object of this invention is to reduce unpredictable variations from a filtered fundamental signal due to inherent circuit characteristics of the source of the filtered fundamental signal, such as but not limited to, switching transients in the source circuit components and non-linearity of the switches in the source circuit components. The reduction of unpredictable variations of the filtered fundamental signal being accomplished by the use of a closed loop circuit that does not include a filter the absence of which removes the closed loop transfer function induced by a filter as well as the non-linearity response to waveform and the filter time constant.

In the attainment of the foregoing objects, the invention contemplates in its preferred embodiment a pulse width modulated inverter circuit having an output signal with reduced harmonic content.

The inverter circuit includes in combination a main pulse width modulated inverter electrically coupled to a filter to provide a filtered fundamental pulse width modulated signal simultaneously to a controlled harmonic reduction pulse width modulated inverter and to a main summing circuit. The inverter circuit also includes a source of DC power electrically coupled to the pulse width modulated inverter.

The controlled harmonic reduction pulse width modulated inverter provides a signal to the summing circuit which signal is a function of the sum of a desired waveform signal and the filtered fundamental pulse width modulated signal.

The controlled harmonic reduction pulse width modulated inverter includes a first summing circuit that is provided with inputs that represent the desired waveform signal and the filtered fundamental pulse width modulated signal. The first summing circuit provides an error signal to a second summing circuit that sums the error signal with a signal of a given frequency. The second summing circuit has an output signal that is coupled through a secondary inverter circuit to the main pulse width modulated inverter and a filter to thereby provide the output signal with reduced harmonic content.

Other objects and advantages of the present invention will be apparent upon reference to the accompanying description when taken in conjunction with the following drawings:

BRIEF DESCRIPTION OF DRAWINGS

FIG. 2 thru FIG. 9 represents the waveforms present at various points in the circuit of FIG. 1.

BEST MODE FOR CARRYING OUT THE INVENTION

Figure 1:
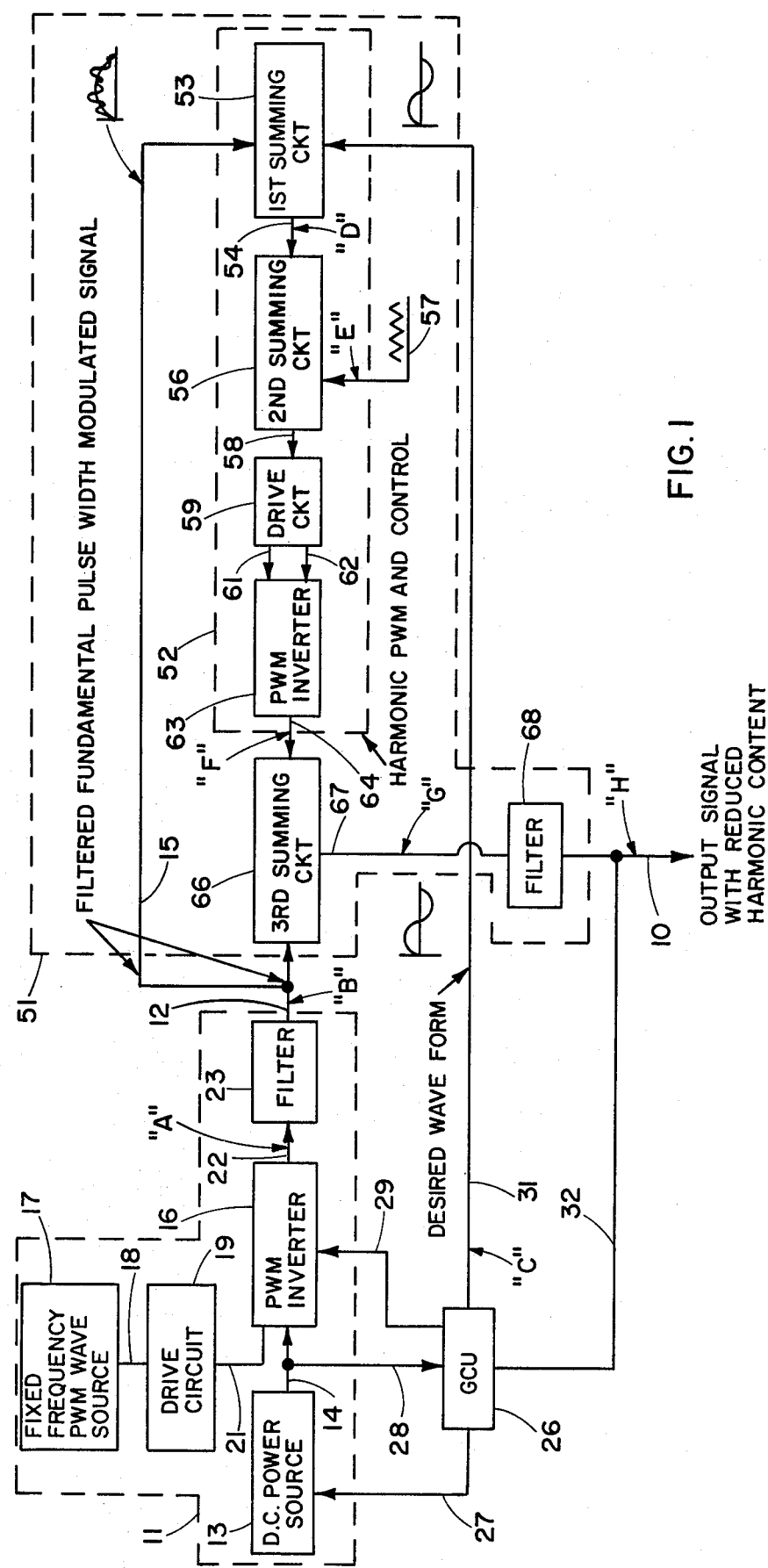
FIG. 1 is a block diagram of a PWM circuit embodying the invention.

Reference is now made to FIG. 1 which illustrates in block diagram form the PWM circuit that embodies the invention. It will be observed in FIG. 1 that there are present in dotted outline two major groupings of circuit components, namely, a primary or first circuit 11 which provides a filtered fundamental PWM signal via a lead 12 to a secondary or second circuit 51. The secondary circuit provides the output signal 10 with reduced harmonic content.

The primary circuit 11 includes a DC power source 13 which is electrically coupled via lead 14 to and through a main PWM inverter 16 and lead 22 to a low pass filter 23 to provide the filtered fundamental PWM signal on lead 12 noted hereinbefore.

The preferred embodiment of the invention contemplates the inclusion of fixed frequency PWM wave source 17 to drive the main PWM inverter 16. The fixed frequency PWM wave source is electrically coupled via lead 18 to a drive circuit 19 and lead 21 to the main PWM inverter 16. The details of the fixed frequency PWM wave source 17 and the drive circuit 19 are not shown as these electrical devices are of conventional design. The inverter 16 may be programmed by means not shown for a fixed duty cycle or a controlled duty cycle.

The secondary circuit 51 includes a first summing circuit 53 that simultaneously receives the filtered fundamental PWM signal on lead 15 from lead 12 and filter 23 of the primary circuit 11, and a desired sine waveform signal on lead 31 from a generator control unit (GCU) 26. The first summing circuit 53 senses the filtered fundamental signal on lead 15 and compares it to the desired form of the sine wave on lead 31. The first summing circuit 53 provides on lead 54 an error signal which is used to generate the PWM waveform of the controlled harmonic PWM inverter 52 shown in dotted outline. The controlled harmonic PWM inverter 52 includes, as is shown in the dotted outline a second summing circuit 56, which receives on lead 54 the aforementioned error signal. The second summing circuit 56 is provided with a triangular waveform signal of a given frequency on lead 57. Both the first and second summing circuits 53 and 56 may be conventional operational amplifiers. The first summing circuit 53 operates as an algebraic summer with gain $V_{out}=K(A_{in}-B_{in})$; where $V_{out}$ is represented by the waveform "D", FIG. 5 on lead 54; $A_{in}$ is the waveform "B" of FIG. 3 on lead 15 and $B_{in}$ is represented by the waveform "C" of FIG. 4 on lead 31. The second summer 56 operates as a comparator. The output of the second summing circuit 56 on lead 58 is delivered to a drive circuit 59 which in turn is electrically coupled via leads 61, 62 to secondary PWM inverter 63. The secondary or harmonic inverter 63, as it may be termed, could run at a higher frequency than the primary or main PWM inverter 16 to thereby obtain better harmonic reduction.

The output signal which may be termed a trim waveform or harmonic waveform from secondary PWM inverter 63 on lead 64, is delivered to a third summing circuit 66 which simultaneously receives on lead 12 the filtered fundamental PWM signal from the primary circuit 11. The summing circuit 66 in the preferred embodiment takes the form of a transformer and performs the function of power handling ratio control, as well as providing a means for summing in the trim waveform. The invention contemplates that between 90 to 110% of the fundamental output power could be handled by the main PWM inverter 16, while 10% could be handled by the controlled harmonic PWM inverter 52. This example might be termed a worst case situation.

The harmonic waveform on lead 64 from the PWM inverter 63 is summed with the filtered fundamental waveform signal from the primary circuit 11 in the third summing circuit 66, and the net result on lead 67 is the harmonic PWM inverter waveform superimposed on the filtered output on lead 12 of the main PWM inverter 16. The harmonic PWM inverter waveform superimposed on the filtered fundamental PWM signal has its amplitude ratio determined by the third summing circuit which is fixed.

The D.C. power source 13 may in practice consist of an alternator, rectifier and filter. The rectifier may be of the controllable SCR type. The details of D.C. power source construction do not form a part of the invention, and are therefore not shown. The alternator (not shown) of the D.C. power source 13 is controlled by a conventional generator control unit GCU 26 over lead 27, with GCU 26 monitoring the D.C. power source 13 output received over leads 14, 28. The main PWM inverter 16 is likewise controlled over lead 29 by GCU 26 in a conventional manner. The GCU 26 also provides in conventional manner the desired sine waveform on lead 31 to the first summing circuit 53. The GCU 26 also routinely monitors the output signal with reduced harmonic content on lead 10 by the electrical connection made by lead 32.

The output on lead 67 from the third summing circuit 66 is filtered by filter 68 to provide the reasonably smooth output waveform with reduced harmonic content on lead 10.

It should be recognized that the arrangement described provides a closed loop without involving filter time constants.

Reference is now made to FIGS. 2 through 9 which illustrate the nature of the waveforms present throughout the inverter circuit configuration of FIG. 1 that embodies the invention.

In a study of FIGS. 2 to 9, it should be kept in mind that for purposes of illustration only, the waveforms are given an exaggerated appearance in order to facilitate the understanding of the operation of the invention.

In FIG. 2 there is shown a typical PWM pulse train at point A on lead 22 from PWM inverter 16 of FIG. 1. The waveform illustrated is intended to represent one-half or 180° of the square waves necessary to produce a sine wave sought as an output of the inverter circuit of the invention.

In a manner described in respect of FIG. 1, the signal of point A is delivered to a filter 23 which produces on lead 12 the waveform of point "B" as shown in FIG. 3. The curve of FIG. 3 is intended to convey by the irregularity of the waveform at points 1, 2, 3, 4, 5, 6 and 7 that there are as a consequence of the variable nature of the switching times, i.e., switching transients in the main PWM inverter 16 non-linear imperfections in the resultant waveform from the filter 23. Source load characteristics are also reflected in waveform imperfections. It is recognized that for a given output waveform and number of pulses per cycle, the harmonic content may be calculated and the results are normally compared to a sine wave as a measure of quality. In the prior art the PWM transistor inverters are generally operated at fixed multiples of pulses per cycle, such as 3 or 15. In fact, any number of pulses per cycle have been considered. In order to reduce the harmonic content and compensate for the switching transient in the PWM inverter, it has been a common expedient to attempt to vary or modulate the angles at which switching occurs, or even the frequency of the PWM inverter. However, when the switching frequency increases, so do transient switching time losses of the inverter transistors.

As the description of the invention further unfolds, it will be appreciated that the main PWM inverter 16 operates at a fixed frequency, and there is added to the filtered fundamental signal of FIG. 3 a second PWM signal, FIG. 7 that results in harmonic reduction in an output signal, point H of FIG. 1, which is depicted in FIG. 9.

The first summing circuit 53 simultaneously receives the signals over leads 15 and 31 which are shown as the waveforms at points B and C of FIGS. 4 and 5 respectively. The output signal from the first summing circuit 53 on lead 54, i.e., point D of FIG. 1 is shown in FIG. 5. The time scales of FIGS. 5 to 9 have been expanded in order to better show the operation being reported.

The second summing circuit 56 simultaneously receives the signal shown in FIG. 5, which may be termed an error signal from the first summing circuit 53 and the triangular waveform signal of FIG. 6. The resultant output signal from the second summing circuit 56 is delivered to and through drive circuit 59 and PWM inverter 63 which delivers an output signal having the waveform illustrated in FIG. 7. From the description heretofore set forth, it will be recalled that the first and second summing circuits may in practice be operational amplifiers, while the third summing circuit 66 is of the transformer type. Studying FIG. 1, it can be seen that the third summing circuit 66 receives the filtered fundamental waveform signal of FIG. 3, as well as the harmonic control PWM signal of FIG. 7.

In FIG. 8 there is illustrated the output signal from the third summing circuit 66. The waveform of FIG. 8 is intended to graphically represent the sum of the fluxes in the transformer of the third summing circuit 66. The passage of the signal shown in FIG. 8, i.e., the signal at point G on lead 67, through the filter 68 results in the output signal of FIG. 9 which has reduced harmonic content.

Figure 10:
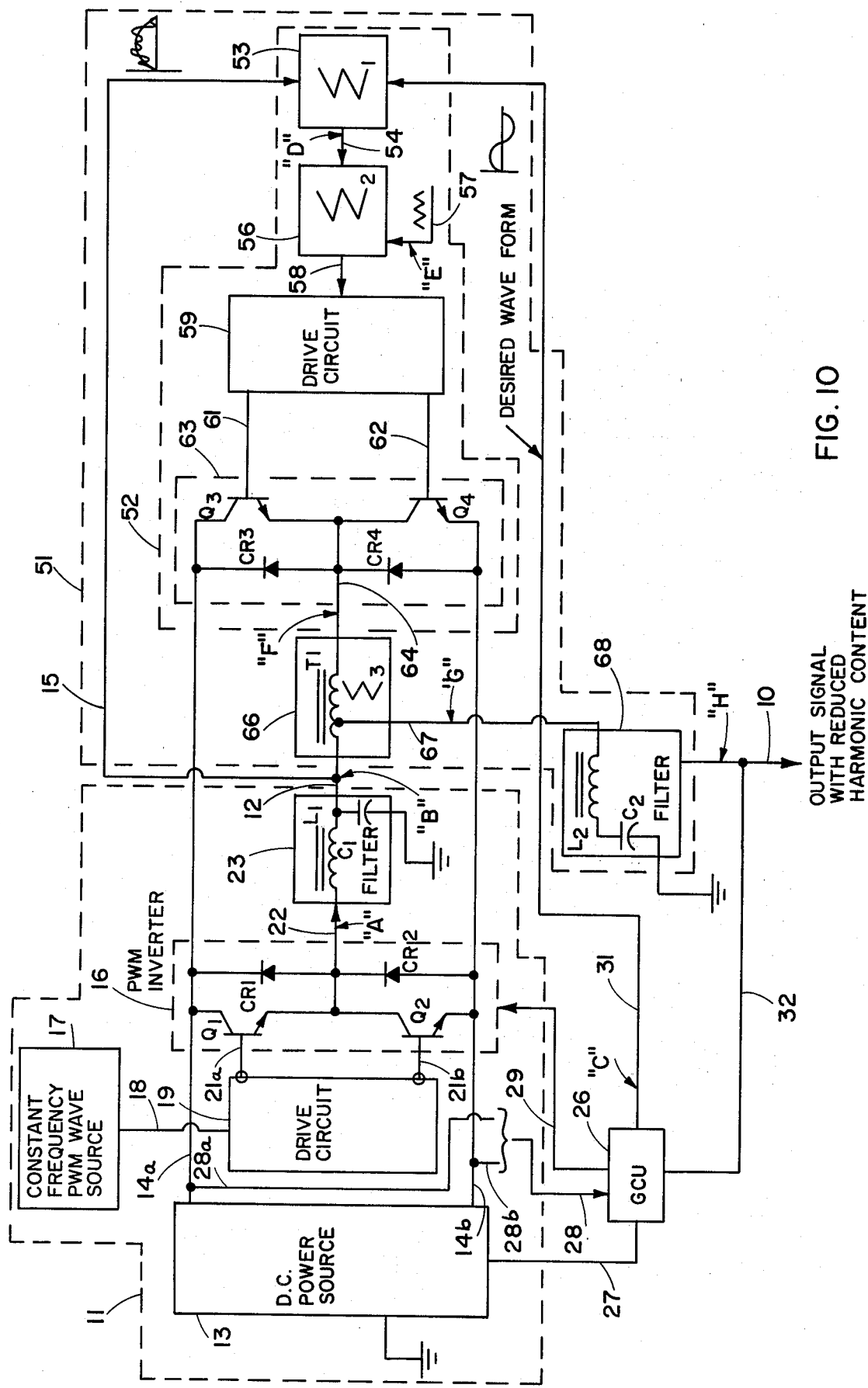
FIG. 10 is a simplified circuit schematic of the preferred embodiment of the invention.

Reference is now made to FIG. 10 which illustrates a simplified version of the preferred embodiment of the invention.

The reference numerals used throughout FIG. 10 are the same as those employed in FIG. 1 to designate identical components. The waveforms A through H described in respect of FIGS. 2 to 9 also apply to the operation of the embodiment of the invention as it is illustrated in FIG. 10. The comments in respect of these waveforms noted hereinbefore apply equally to the circuit of FIG. 10. The operation of FIG. 10 is therefore identical in operation to the more generalized block diagram of FIG. 1. However, a number of components in FIG. 10 now are shown with the details of their electrical circuit components shown interconnected.

It will be observed that the main PWM inverter 16 shown in dotted outline in FIG. 10 has illustrated as included therein, transistors Q1, Q2 and diodes CR1, CR2 connected between leads 14a, 14b from the D.C. power source 13. The diodes CR1, CR2 handle regenerative currents in a conventional manner. In a similar fashion, the secondary or harmonic PWM inverter 63 is depicted with transistors Q3, Q4 and diodes CR3, CR4 connected across the leads 14a, 14b from the D.C. power source 13. The diodes CR3, CR4 in a manner similar to diodes CR1, CR2 handle regenerative currents. The filter 23 includes an inductance L1 and a capacitor C1 connected as shown with a ground. The final output filter 68 likewise includes an inductance L2 and a capacitor C2, as well as a ground.

The third summing circuit 66 is comprised of a summing transformer T1, which is shown tapped so that the main PWM inverter 16 provides 100% of the output voltage at the peak of the sine wave. The harmonic PWM inverter 16 duty cycle controls the percent correction between ±10%. In respect of the final output filter 68, the components L2 and C2 are sized to filter the harmonic PWM inverter waveform, as well as carry the filtered fundamental output described earlier.

The generator control circuit GCU is shown only in schematic form in so far as its interconnection via leads 26, 27, 28, 29, 31 and 32 to the inverter circuit of the invention.

The control circuits for each of the inverters are conventional, and therefore are not shown.

Although this invention has been illustrated and described in connection with the particular embodiments illustrated, it will be apparent to those skilled in the art that various changes may be made therein without departing from the spirit of the invention as set forth in the appended claims.

I claim:

1. A PWM inverter circuit having an output signal with reduced harmonic content, said circuit including:
   first means to provide a filtered fundamental PWM signal,
   second means electrically coupled to said first means to receive said signal and sum therewith a controlled signal that is the function of the sum of a desired waveform signal and said filtered fundamental PWM signal, said second means providing said output signal with reduced harmonic content.

2. The PWM inverter circuit of claim 1 wherein said first means includes a DC power source electrically coupled to and through a main PWM inverter to a filter means to thereby provide said filtered fundamental PWM signal.

3. The PWM inverter circuit of claim 2 wherein said main PWM inverter is electrically coupled through a drive circuit to a fixed frequency PWM wave source.

4. The PWM inverter circuit of claim 1 wherein said second means includes a first summing means provided with said desired waveform signal and said filtered fundamental PWM signal, said first summing means providing an error signal to a second summing means that sums said error signal with a signal of a given frequency, the output signal of said second summing means is electrically coupled to and through a secondary inverter and a third summing means to a filter means to thereby provide at the filter output said output signal with reduced harmonic content.

5. The PWM inverter circuit of claim 4 wherein a drive circuit means is included in said electrical coupling between said second summing means and said secondary inverter.

6. The PWM inverter circuit of claim 5 wherein said secondary inverter is electrically coupled to said DC power source.

7. The PWM inverter circuit of claim 2 wherein said second means includes a first summing means provided with said desired waveform signal and said filtered fundamental PWM signal, said first summing means providing an error signal to a second summing means that sums said error signal with a signal of a given frequency, the output signal of said second summing means is electrically coupled to and through a secondary inverter and a third summing means to a filter means to thereby provide at the filter output said output signal with reduced harmonic content.

8. The PWM inverter circuit of claim 7 wherein a drive circuit means is included in said electrical coupling between said second summing means and said secondary inverter.

9. The PWM inverter circuit of claim 8 wherein said secondary inverter is electrically coupled to said DC power source.

10. A pulse width modulated inverter circuit having an output signal with reduced harmonic content, said inverter circuit including in combination:
 a pulse width modulated inverter electrically coupled to a filter to provide a filtered fundamental pulse width modulated signal simultaneously to a controlled harmonic reduction pulse width modulated inverter means and to a main summing means,
 said controlled harmonic reduction pulse width modulated inverter means providing a signal to said main summing means which signal is a function of the sum of a desired waveform signal and said filtered fundamental pulse width modulated signal,
 said main summing means electrically coupled to and through a filter means to provide said output signal with reduced harmonic content.

11. The inverter circuit of claim 10 wherein said combination includes a source of DC power electrically coupled to said pulse width modulated inverter.

12. The inverter circuit of claim 10 wherein said controlled harmonic reduction pulse width modulated inverter includes a first summing means provided with said desired waveform signal and said filtered fundamental pulse width modulated signal, said first summing means providing an error signal to a second summing means that sums said error signal with a signal of a given frequency, the output signal of said second summing means is electrically coupled to and through a secondary inverter and said main summing means to a filter means to thereby provide at the filter output said output signal with reduced harmonic content.

13. The inverter circuit of claim 12 wherein a drive circuit means is included in said electrical coupling between said second summing means and said secondary inverter.

14. The inverter circuit of claim 13 wherein said secondary inverter is electrically coupled to said DC power source.

15. The inverter circuit of claim 10 wherein said pulse width modulated inverter is electrically coupled through a drive circuit to a fixed frequency PWM wave source.

16. The inverter circuit of claim 11 wherein said controlled harmonic reduction pulse width modulated inverter includes a first summing means provided with said desired waveform signal and said filtered fundamental pulse width modulated signal, said first summing means providing an error signal to a second summing means that sums said error signal with a signal of a given frequency, the output signal of said second summing means is electrically coupled to and through a secondary inverter and said main summing means to a filter means to thereby provide at the filter output said output signal with reduced harmonic content.

17. The inverter circuit of claim 16 wherein a drive circuit means is included in said electrical coupling between said second summing means and said secondary inverter.

18. The inverter circuit of claim 17 wherein said secondary inverter is electrically coupled to said DC power source.

19. The inverter circuit of claim 16 wherein said pulse width modulated inverter is electrically coupled through a drive circuit to a fixed frequency PWM wave source.

* * * * *